(12) United States Patent
Bartlett et al.

(10) Patent No.: US 9,985,985 B2
(45) Date of Patent: May 29, 2018

(54) METHOD OF DISTRIBUTED DENIAL OF SERVICE (DDOS) AND HACKING PROTECTION FOR INTERNET-BASED SERVERS USING A PRIVATE NETWORK OF INTERNET SERVERS BY EXECUTING COMPUTER-EXECUTABLE INSTRUCTIONS STORED ON A NON-TRANSITORY COMPUTER-READABLE MEDIUM

(71) Applicant: AAA Internet Publishing, Inc., Kelowna (CA)

(72) Inventors: Robert Michael Norman Bartlett, Kelowna (CA); Alexander Edward Needham, West Kelowna (CA); Keelan Lightfoot, Lake Country (CA)

(73) Assignee: AAA Internet Publishing Inc., Kelowna (CA)

( * ) Notice: Subject to any disclaimer, the term of this patent is extended or adjusted under 35 U.S.C. 154(b) by 0 days. days.

(21) Appl. No.: 15/439,677

(22) Filed: Feb. 22, 2017

(65) Prior Publication Data

US 2017/0163679 A1    Jun. 8, 2017

Related U.S. Application Data

(63) Continuation-in-part of application No. 14/731,286, filed on Jun. 4, 2015, now Pat. No. 9,614,870, and a
(Continued)

(51) Int. Cl.
*H04L 29/06* (2006.01)

(52) U.S. Cl.
CPC ...... *H04L 63/1458* (2013.01); *H04L 63/0245* (2013.01); *H04L 63/0281* (2013.01);
(Continued)

(58) Field of Classification Search
CPC ............. H04L 63/1408; H04L 63/1458; H04L 63/0281; H04L 63/1425; H04L 63/0245
See application file for complete search history.

(56) References Cited

U.S. PATENT DOCUMENTS 7,159,234 B1 *   1/2007   Murphy .............. G06F 11/2028
                                                                    714/11
7,633,869 B1 * 12/2009   Morris ................ H04L 41/0896
                                                                    370/232
(Continued)

OTHER PUBLICATIONS

Kandula, Srikanth, Ranveer Chandra, and Dina Katabi. "What's going on?: learning communication rules in edge networks." ACM SIGCOMM Computer Communication Review. vol. 38. No. 4. ACM, 2008. pp. 87-98.*

(Continued)

*Primary Examiner* — Kari Schmidt
(74) *Attorney, Agent, or Firm* — Venable LLP; Steven J. Schwarz; Tamatane J. Aga (57) ABSTRACT

A method of DDoS and hacking protection for internet-based servers using a private network of internet servers utilizes multiple data streams sent over a network of proxy servers to mitigate malicious attacks and ensure fast connections from a user to a destination server. The destination server is hidden from the user and the redundancy of the proxy network serves to maintain security and connection quality between the user and the destination server.

10 Claims, 12 Drawing Sheets

Related U.S. Application Data continuation-in-part of application No. 14/047,678, filed on Oct. 7, 2013, and a continuation-in-part of application No. 15/399,303, filed on Jan. 5, 2017, now Pat. No. 9,742,646, which is a continuation of application No. 14/066,277, filed on Oct. 29, 2013, now Pat. No. 9,571,359, application No. 15/439,677, which is a continuation-in-part of application No. 14/812,968, filed on Jul. 29, 2015, now Pat. No. 9,729,504, and a continuation-in-part of application No. 15/335,304, filed on Oct. 26, 2016, and a continuation-in-part of application No. 15/335,308, filed on Oct. 26, 2015.

(60) Provisional application No. 62/007,787, filed on Jun. 4, 2014, provisional application No. 61/710,026, filed on Oct. 5, 2012, provisional application No. 61/720,232, filed on Oct. 30, 2012, provisional application No. 61/719,602, filed on Oct. 29, 2012, provisional application No. 62/030,384, filed on Jul. 29, 2014, provisional application No. 62/246,304, filed on Oct. 26, 2015, provisional application No. 62/246,397, filed on Oct. 26, 2015.

(52) U.S. Cl.
CPC ...... *H04L 63/1408* (2013.01); *H04L 63/1425* (2013.01); *H04L 2463/141* (2013.01)

(56) References Cited

U.S. PATENT DOCUMENTS

| | | | | |
|---|---|---|---|---|
| 8,739,269 B2* | 5/2014 | Dargis | ............... | H04L 63/0272 709/224 |
| 9,160,711 B1* | 10/2015 | Sweet | ............... | H04L 63/0245 |
| 2002/0009079 A1* | 1/2002 | Jungck | ............... | H04L 29/12066 370/389 |
| 2004/0148520 A1* | 7/2004 | Talpade | ............... | H04L 63/1458 726/22 |
| 2005/0180416 A1* | 8/2005 | Jayawardena | .......... | H04L 45/00 370/389 |
| 2007/0086338 A1* | 4/2007 | Robert | ............... | H04L 63/1458 370/230 |
| 2008/0279213 A1* | 11/2008 | Tong | ................ | H04L 12/40143 370/458 |
| 2009/0262741 A1* | 10/2009 | Jungck | ............. | H04L 29/12066 370/392 |
| 2010/0036954 A1* | 2/2010 | Sakata | ................ | H04L 12/6418 709/226 |
| 2013/0298220 A1* | 11/2013 | Yoon | .................. | H04L 63/0245 726/12 |
| 2014/0098662 A1* | 4/2014 | Jungck | ............. | H04L 29/12066 370/230 |
| 2014/0259109 A1* | 9/2014 | Houston | ................ | H04L 63/10 726/3 |
| 2014/0344331 A1* | 11/2014 | Johns | ..................... | H04L 67/16 709/203 |
| 2015/0341312 A1* | 11/2015 | Ezell | ..................... | H04L 63/029 726/11 |

OTHER PUBLICATIONS

M. Brinkmeier, G. Schäfer and T. Strufe, "Optimally DoS Resistant P2P Topologies for Live Multimedia Streaming," in IEEE Transactions on Parallel and Distributed Systems, vol. 20, No. 6, pp. 831-844, Jun. 2009.*

Krishnan, Rajesh, Dinesh Venkatesh, and Thomas DC Little. "A failure and overload tolerance mechanism for continuous media servers." Proceedings of the fifth ACM international conference on Multimedia. ACM, 1997. pp. 131-142.*

* cited by examiner

METHOD OF DISTRIBUTED DENIAL OF SERVICE (DDOS) AND HACKING PROTECTION FOR INTERNET-BASED SERVERS USING A PRIVATE NETWORK OF INTERNET SERVERS BY EXECUTING COMPUTER-EXECUTABLE INSTRUCTIONS STORED ON A NON-TRANSITORY COMPUTER-READABLE MEDIUM

The current application is a continuation-in part (CIP) application of the U.S. non-provisional application Ser. No. 14/731,286 filed on Jun. 4, 2015. The U.S. nonprovisional application Ser. No. 14/731,286 claims a priority to the U.S. Provisional Patent application Ser. No. 62/007,787 filed on Jun. 4, 2014.

FIELD OF THE INVENTION

The present invention relates generally to internet security. More specifically, the present invention is a method for protection against malicious activity utilizing a private network of Internet servers that hides potentially vulnerable servers from the user base and the general public.

BACKGROUND OF THE INVENTION

Denial of service (DoS) and distributed denial of service (DDoS) attacks relate generally to malicious attempts to disrupt and/or halt the services of a network host that is connected to the Internet. A DoS attack is typically carried out by a single person or system whereas a DDoS attack is carried out by two or more people or multiple systems. There are many types of attacks that may affect a network host's performance. Volume-based attacks seek to consume the bandwidth of the targeted server, overloading the server and disrupting service to legitimate users trying to access the server. Protocol attacks seek to consume actual server resources as well as those of communication equipment in order to disrupt legitimate traffic. Application layer attacks target and disrupt specific weak spots in the server. The overarching goal of these attacks is to crash or flood a targeted server in order to prevent legitimate users of a server from accessing the server. Traditional anti-DDoS and hacking protection methods include the use of a hardware or software firewall that is designed to reduce malicious activity at the targeted server or network. However, while a firewall is effective against small amounts of malicious activity, firewalls are vulnerable to large amounts of malicious activity such as DDoS attacks that are capable of overloading the Internet connection to the servers. Another method is to utilize a network of servers between users and a destination server. The network of servers hides the destination server from users while any malicious activity is sent through the network of servers, rather than to the targeted destination server. Malicious data is removed via a "scrubbing center" while normal data is permitted to continue to the destination server. However, the use of a scrubbing center to remove malicious data causes data performance to suffer due to the significant amount of latency that is added when data is sent to a scrubbing center. Additionally, it is not possible to select the data that is processed at the scrubbing center and all traffic to the destination server must be processed before continuing to the destination server. The present invention seeks to address the aforementioned issues relating to DoS and DDoS security as well as enhance and improve upon conventional methods of security against malicious attacks.

The present invention is a method for protecting a server from DoS and DDoS attacks as well as other forms of malicious activity such as hacking. In the preferred embodiment of the present invention, the system and method are designed to hide an Internet-based server from a user. A custom proxy client is utilized to connect the user to an Internet-based server that the user wishes to access. Major technical details of the Internet-based server such as the domain name and Internet Protocol (IP) address of the server are hidden from the user. The user is connected to a global network of proxy servers through the proxy, henceforth referred to as a global private network (GPN). The GPN serves to effectively hide the location and IP address of the Internet-based server from the user attempting to access the server. The user is connected to an edge server that is located in close proximity to his or her computer. The IP address of the edge server may be known to the user. User data is then transferred from the edge server to one or more unknown GPN servers before being transferred to the destination Internet-based server. During this process, only the IP address of the edge server is known to the user. Edge servers are vulnerable to malicious attack and are considered to be expendable and as such, attacks on edge servers are not problematic.

Data flow through the GPN is optimized in order to ensure that latency, flux, and spikes and loss remain low. Data is processed in order to determine if the data is latency-sensitive, non-latency sensitive, or may be excluded from rerouting. If latency-sensitive data is sent from an originating computer, the data is rerouted through the GPN in a manner such that the data is sent through multiple low latency servers within the GPN for as long as possible. The data is then transferred to the destination server in order to avoid unreliable performance often characteristic of internet service provider (ISP) servers and routers. Non-latency sensitive data is transferred through multiple high bandwidth servers within the GPN prior to being transferred to the destination server. Data that has been excluded from rerouting is transferred directly to the destination server, bypassing the GPN entirely.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a method for protecting a vulnerable Internet-based server from potential malicious user activity such as DoS attacks, DDoS attacks, and hacking. Major details of the server are kept hidden from the user in order to eliminate the possibility of launching malicious attacks on the server. During data flow, the user's data is transferred through a dedicated infrastructure between the user and the destination server. However, all user data processing is handled on the user (client) side and the connection to the edge server.

Figure 6:
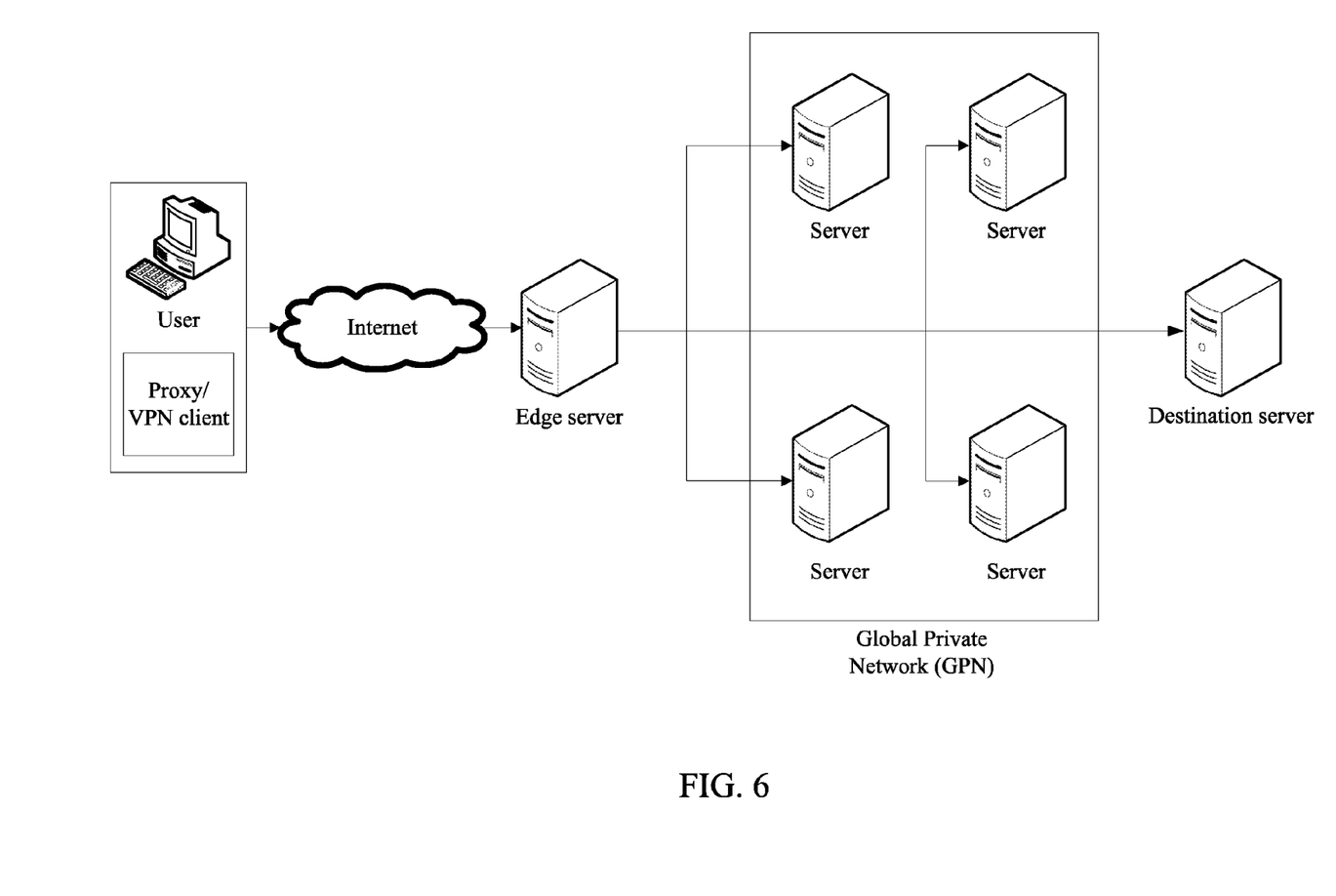
FIG. 6 is a diagrammatic overview of the protection method of the present invention.
Figure 7:
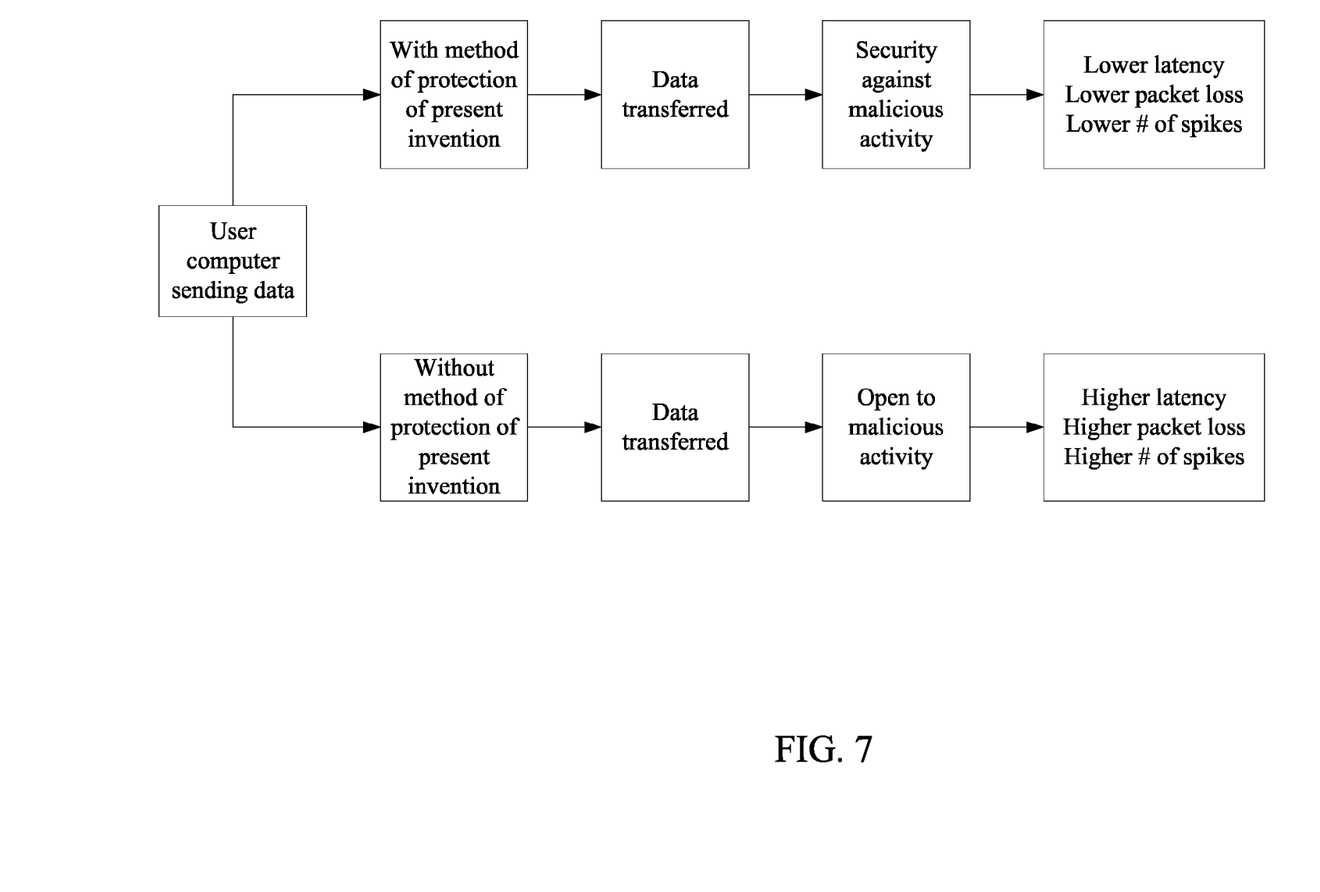
FIG. 7 is a comparison chart displaying results of using and not using the protection method of the present invention.

For the present invention to function, a data routing software must be provided on a computing device, wherein the computing device is any electronic device capable of processing data and interfacing with a digital network such as the Internet, such as, but not limited to, a desktop computer, a laptop computer, a tablet computer, a smartphone, a router, a gaming console, or another computing device. Additionally, a network infrastructure of at least one edge server and a GPN comprising a plurality of GPN servers is provided to be utilized. More specifically, a plurality of edge servers are provided in the preferred embodiment. In one embodiment of the present invention, the data routing software is a proxy software. Furthermore, the proxy software may be a custom proxy client which is made mandatory by an administrator of the system for users to access the system. A general diagram of the system is shown in FIG. 6 and an illustration of the benefit of the present invention is shown in FIG. 7.

Figure 1:
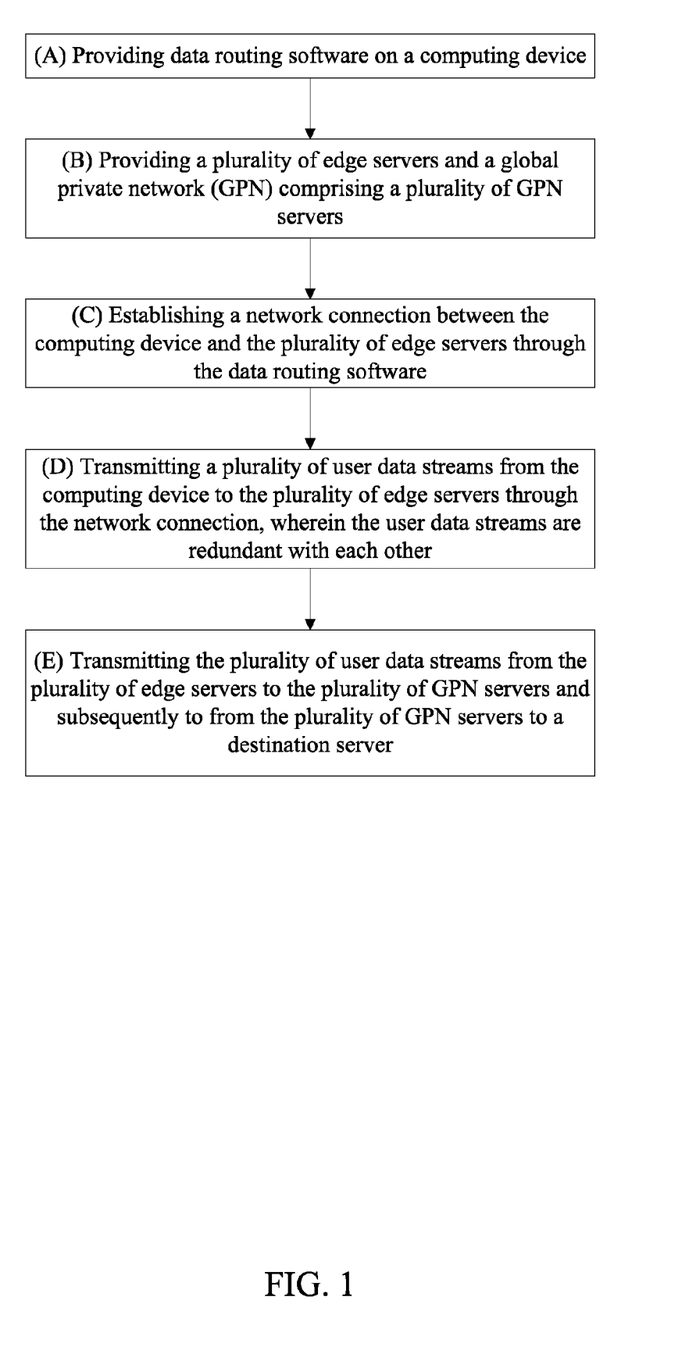
FIG. 1 is a stepwise flow diagram describing the general process of the present invention.

Referring to FIG. 1, in the general process of the present invention, at least one network connection is established or a plurality of network connections are established between the computing device and the edge server through the data routing software. Subsequently, at least one user data stream is transmitted from the computing device to the edge server through the network connection. More specifically, in the preferred embodiment, a plurality of user data streams are transmitted from the computing device to the plurality of edge servers through the network connection, wherein the user data streams are redundant with each other. Having multiple redundant user data streams routed through multiple edge servers creates the advantage of a race condition among the multiple data streams, which can be used to reduce latency, reduce packet loss, and create redundancy if an edge server or a GPN server goes down. However, it should be understood that the present invention should not be unnecessarily limited to having the plurality of user data streams, and may also work with just a single user data stream being transmitted from the computing device. References to a single user data stream or to multiple user data streams, as well as references to a single edge server or multiple edge servers, should not be considered to be limiting of each other. Incoming traffic to the edge server is analyzed to determine if the incoming traffic constitutes malicious activity, wherein the incoming traffic includes the user data stream. If the incoming traffic is determined to be malicious activity, the incoming traffic is blocked at the edge server. As part of the incoming traffic, the user data streams are also analyzed to determine if the user data streams constitute malicious activity. If the user data streams are determined to be malicious activity, the user data streams are blocked at the edge servers. If the user data streams are determined to not be malicious activity, the user data streams are routed from the edge servers through at least one data-type relevant server from the plurality of GPN servers, wherein the user data streams are characterized by at least one of latency-sensitivity, non-latency sensitivity and exclusivity from rerouting through the plurality of GPN servers. The user data streams are then transmitted from the plurality of GPN servers to a destination server after being routed through the at least one data-type relevant server. The result of this arrangement is that the destination server is obfuscated from the computing device by the GPN, and malicious activity is mitigated to provide uninterrupted service.

Figure 2:
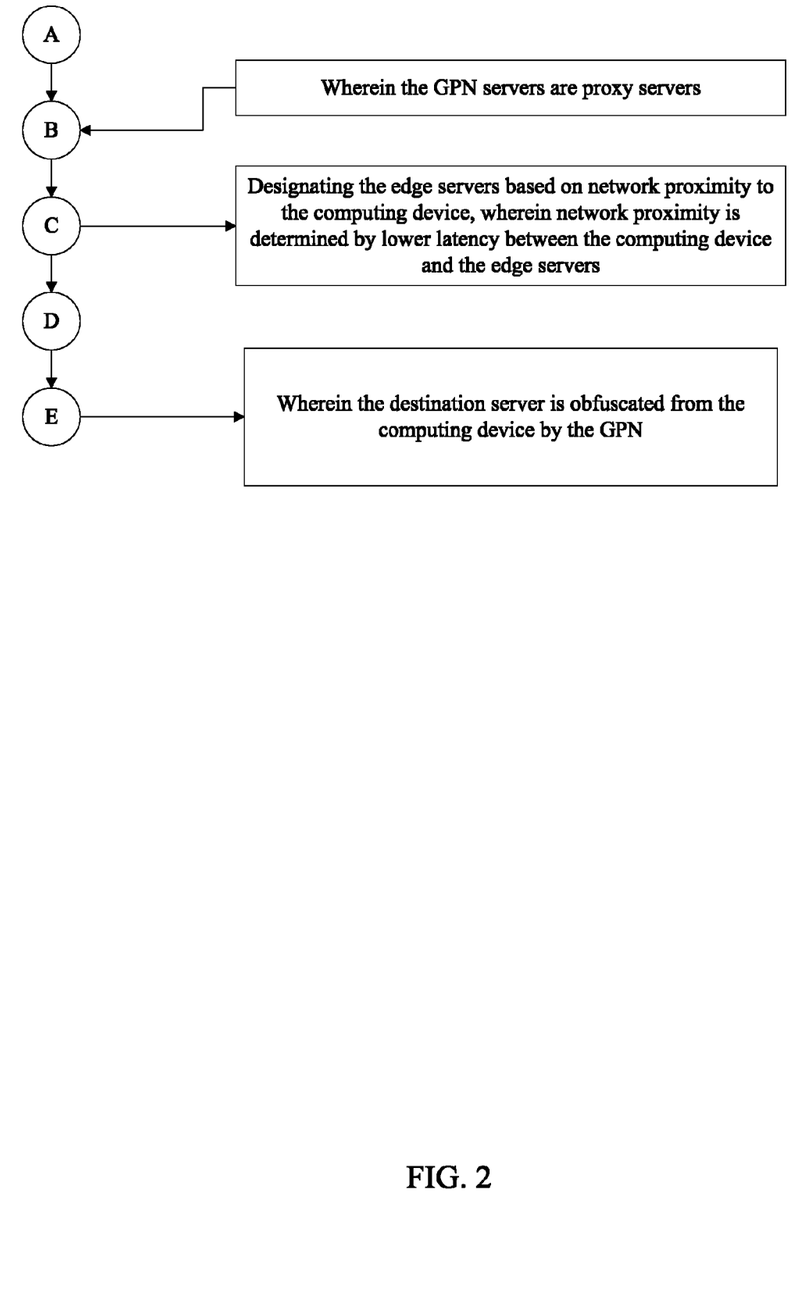
FIG. 2 is a stepwise flow diagram describing steps for server setup and connection.

In the preferred embodiment of the present invention, the network infrastructure comprises a plurality of edge servers. As described in FIG. 2, the edge server the computing device is connected to is preferably designated based on network proximity to the computing device, wherein network proximity is determined by lower latency between the computing device and the edge server. Network proximity may additionally or alternatively be determined by other relevant network factors, such as, but not limited to, bandwidth capability. The computing device is able to view information about the edge server, such as the edge server's IP address. The edge server is also considered to be expendable since the network infrastructure has many edge servers which can serve the same function. A level of protection may be provided for edge servers in the form of filters and firewalls that are capable of blocking unwanted traffic. Dynamic IP addresses, load balancing, and connection redundancy may be implemented as well in order to provide additional protection. Additionally, in the preferred embodiment, the GPN servers are proxy servers. This provides the obfuscation of the destination server from the computing device.

The protection method of the present invention further serves to optimize data flow in order to improve performance. The user data stream is processed in order to determine if the data is latency-sensitive, non-latency sensitive, or may be excluded from rerouting through the GPN. Online video games typically utilize a combination of both latency-sensitive and non-latency sensitive data.

Figure 3:
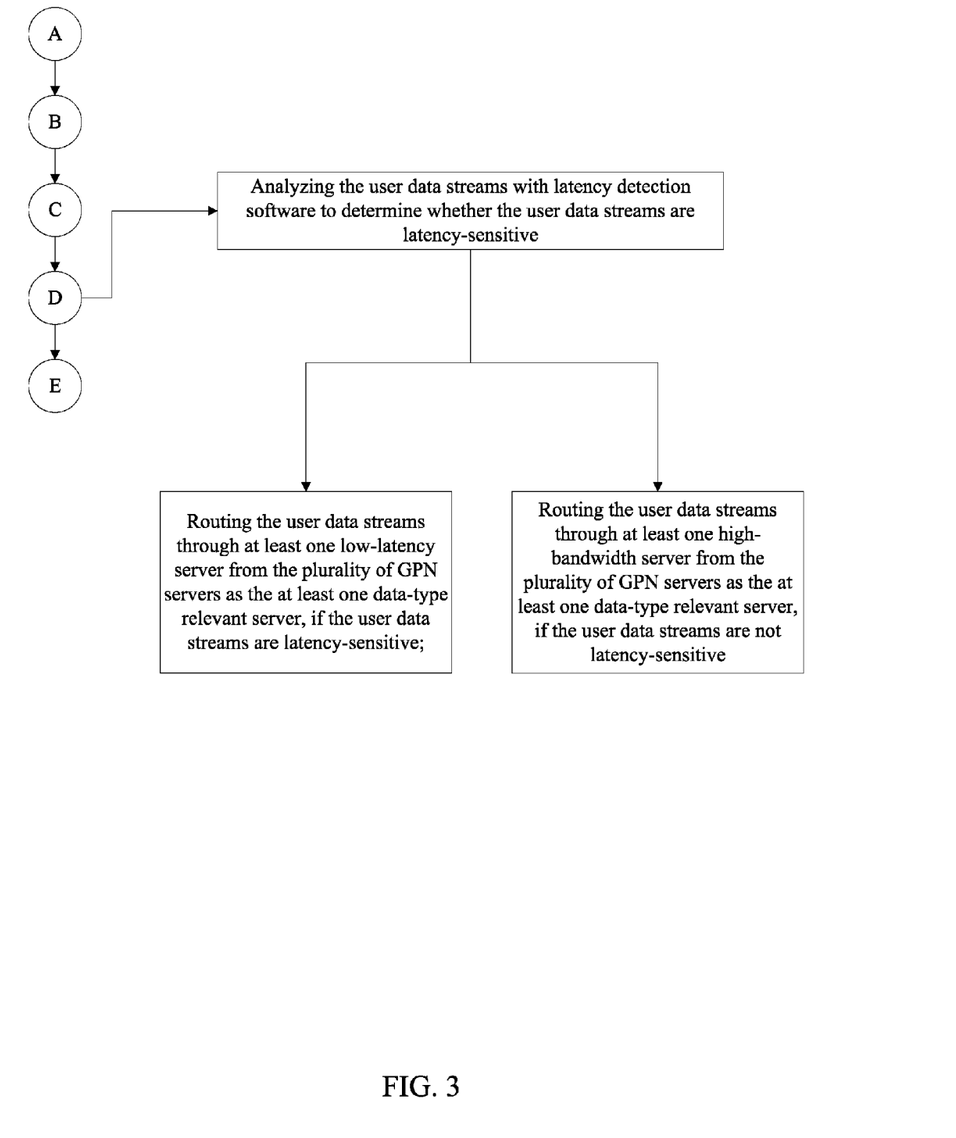
FIG. 3 is a stepwise flow diagram describing steps for routing the user data stream based on latency sensitivity.
Figure 11:
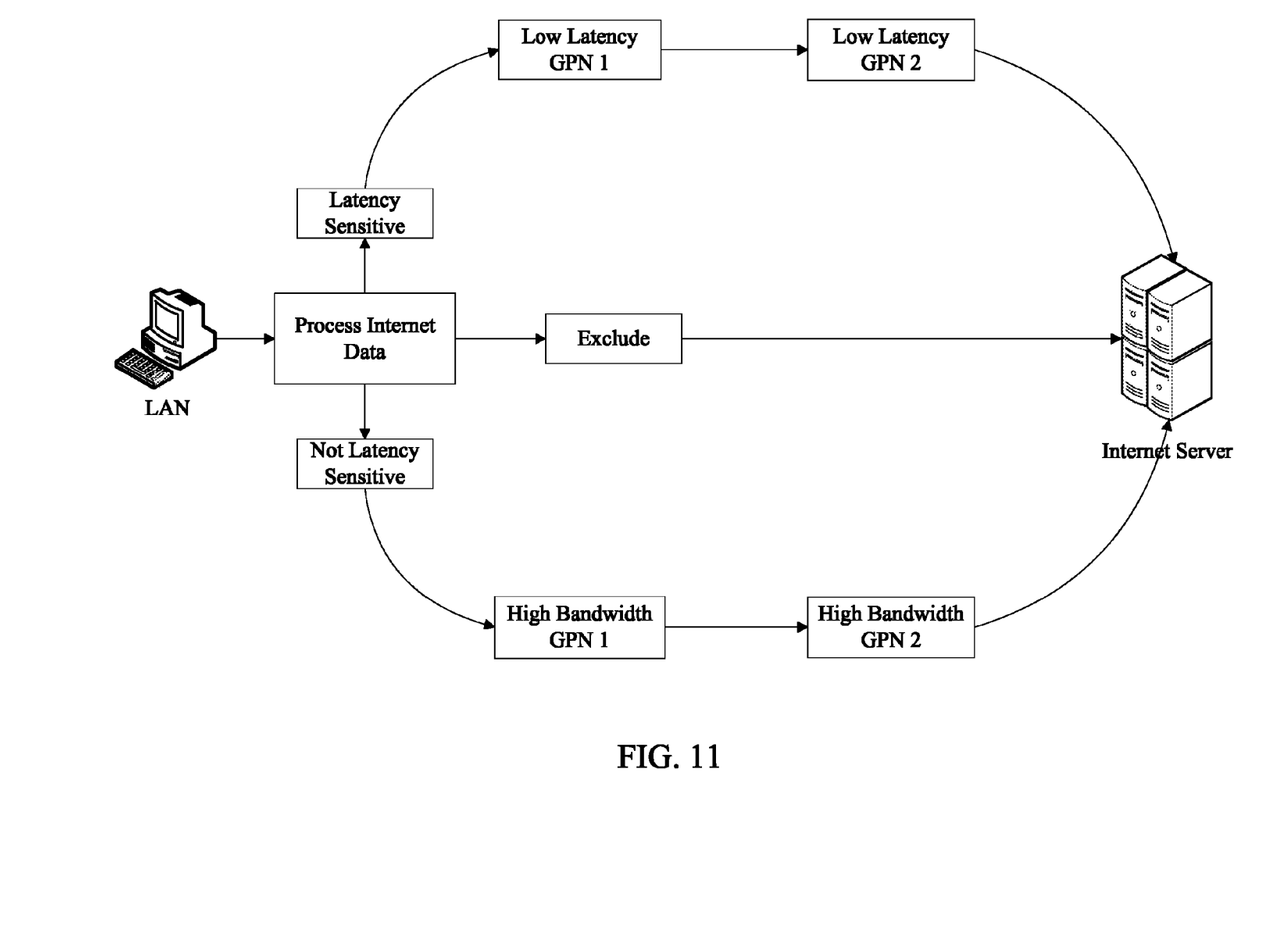
FIG. 11 is a flowchart of data routing paths based on processing of data.

When the user data stream is routed through the GPN, the user data stream is analyzed with latency detection software to determine whether the user data stream is latency-sensitive as shown in FIG. 3. If the user data stream is latency-sensitive, the user data stream is routed through at least one low-latency server from the plurality of GPN servers as the at least one data-type relevant server. This forced routing removes choke points and devices such as routers that typically have high packet loss from the route that is taken by the user data. By avoiding these choke points, the number of transfers from router to router and server to server required of the data is reduced, minimizing or altogether eliminating packet loss between the originating system and the destination server. The data is then transferred directly to the destination server, avoiding the often unreliable performance of ISP servers and routers. Data processing performance of the GPN is constantly monitored in real-time in order to generate performance metrics and ensure that the GPN is able to intelligently route user data. This aspect is also illustrated in FIG. 11.

If the user data stream is not latency sensitive, the user data stream is routed through at least one high-bandwidth server from the plurality of GPN servers as the at least one data-type relevant server. By distinguishing between latency-sensitive and non-latency sensitive data, data processing is optimized due to the fact that portions of the GPN that are reserved for latency-sensitive data are able to perform at maximum. The user stream may also be excluded from rerouting and transferred directly to the destination server.

Routing the user data stream through the GPN effectively hides the location and IP address of the destination server, which is desired to be protected and secure from any attacks. The GPN servers are unknown to the user and the user is unable to view major technical details such as the domain names and IP addresses of the GPN servers.

Figure 4:
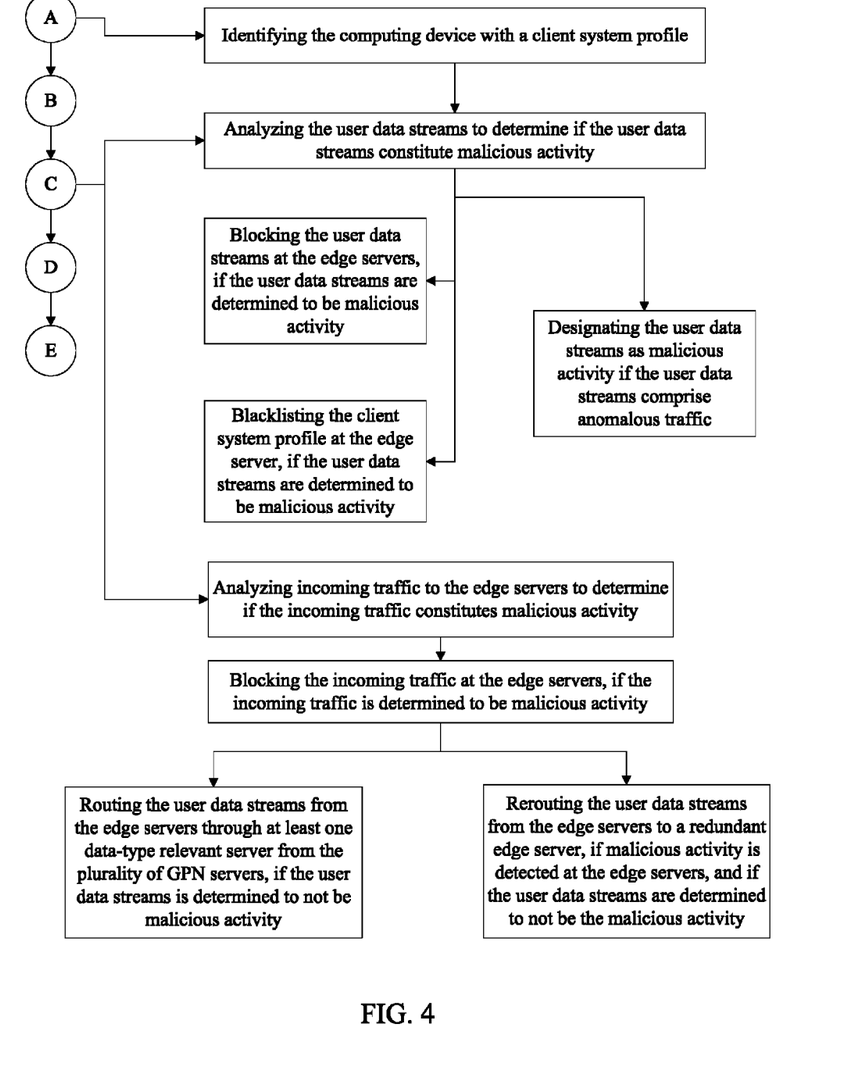
FIG. 4 is a stepwise flow diagram describing steps relating to detecting and mitigating malicious activity.
Figure 8:
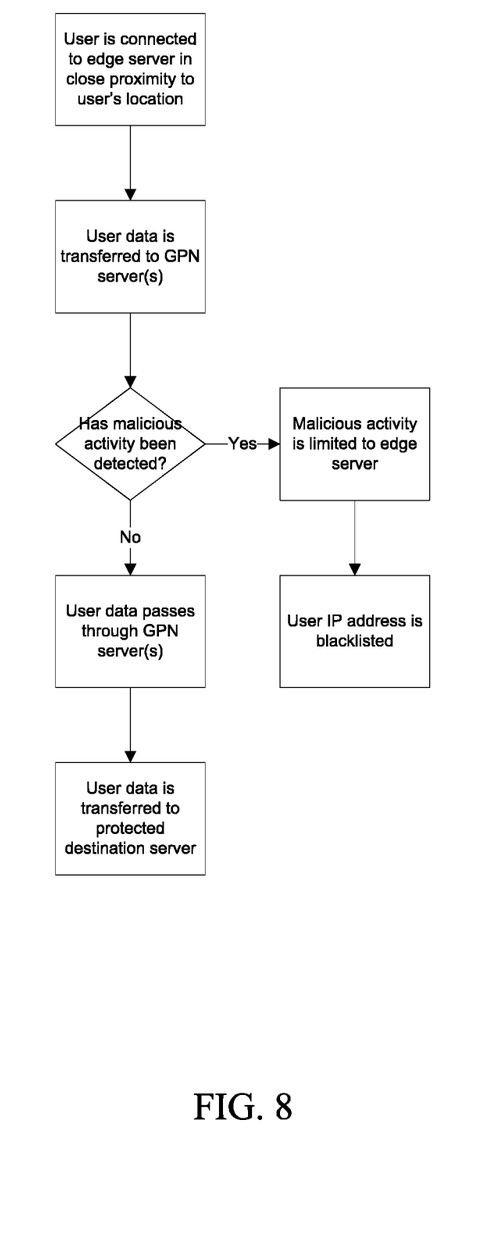
FIG. 8 is a flowchart displaying the movement of user data to a destination server utilizing the protection method of the present invention.
Figure 9:
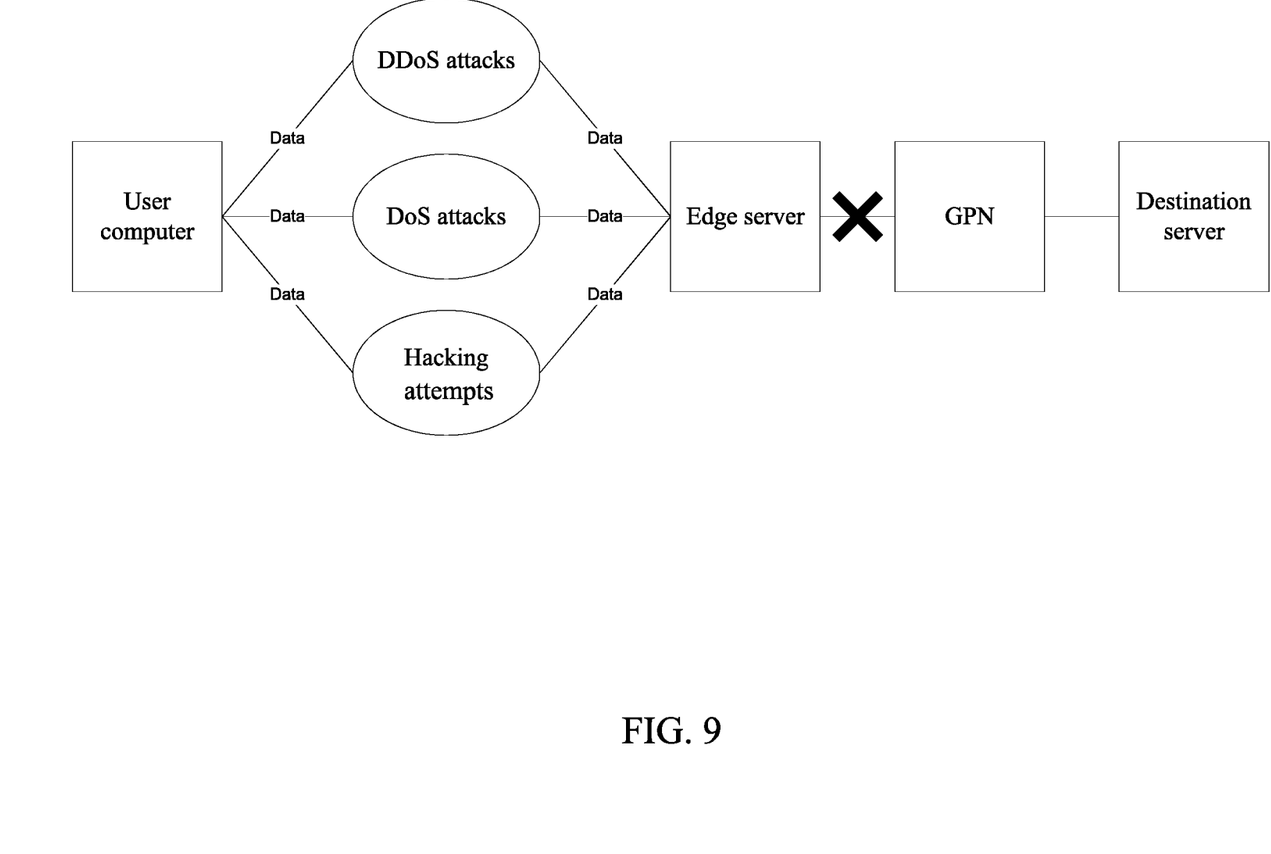
FIG. 9 is a diagram illustrating various types of malicious activity that may be prevented utilizing the protection method of the present invention.

Referring to FIG. 4, in the present invention, the computing device is identified with a client system profile. The client system profile may comprise, but is not limited to, internet protocol (IP) address information, domain name server (DNS) information, client credentials, or other attributes of the computing device such as hardware or software. If the user data stream is determined to be malicious activity, the client system profile is blacklisted at the edge server. FIGS. 8 and 9 depict the manner of limiting malicious activity to the edge server closest to the attacker.

In general, the user data stream is designated as malicious traffic if the user data stream comprises anomalous traffic. While malicious activity may come from users of the present invention through the user data stream, the majority of malicious or anomalous traffic is likely to not come from users of the present invention, but other entities from elsewhere on the general Internet. Anomalous traffic is traffic that is unexpected by the GPN. The network will have traffic statistics based on normal use, and various metrics may be established which, when exceeded, will trigger malicious traffic detection. Alternatively, specialized malicious activity detection software may be utilized. Malicious activity may include, but is not limited to, DoS attacks such as SYN floods and resource exhaustion, DDoS attacks such as DNS reflection or IP reflection, hacking attempts, or other attacks. Malicious activity may conceivably be detected through a variety of means, and the particular method of accomplishing this is not of particular importance to the present invention so much that it is in fact accomplished.

One important aspect of the present invention is redundancy through expendable edge servers. If malicious activity is detected at the edge server the user data stream is being routed through, or if the edge server fails for any other reason, the user data stream is routed to a redundant edge server, provided that the malicious activity is not the user data stream. The redundant edge server is simply another of the plurality of edge servers in the network infrastructure.

Figure 10:
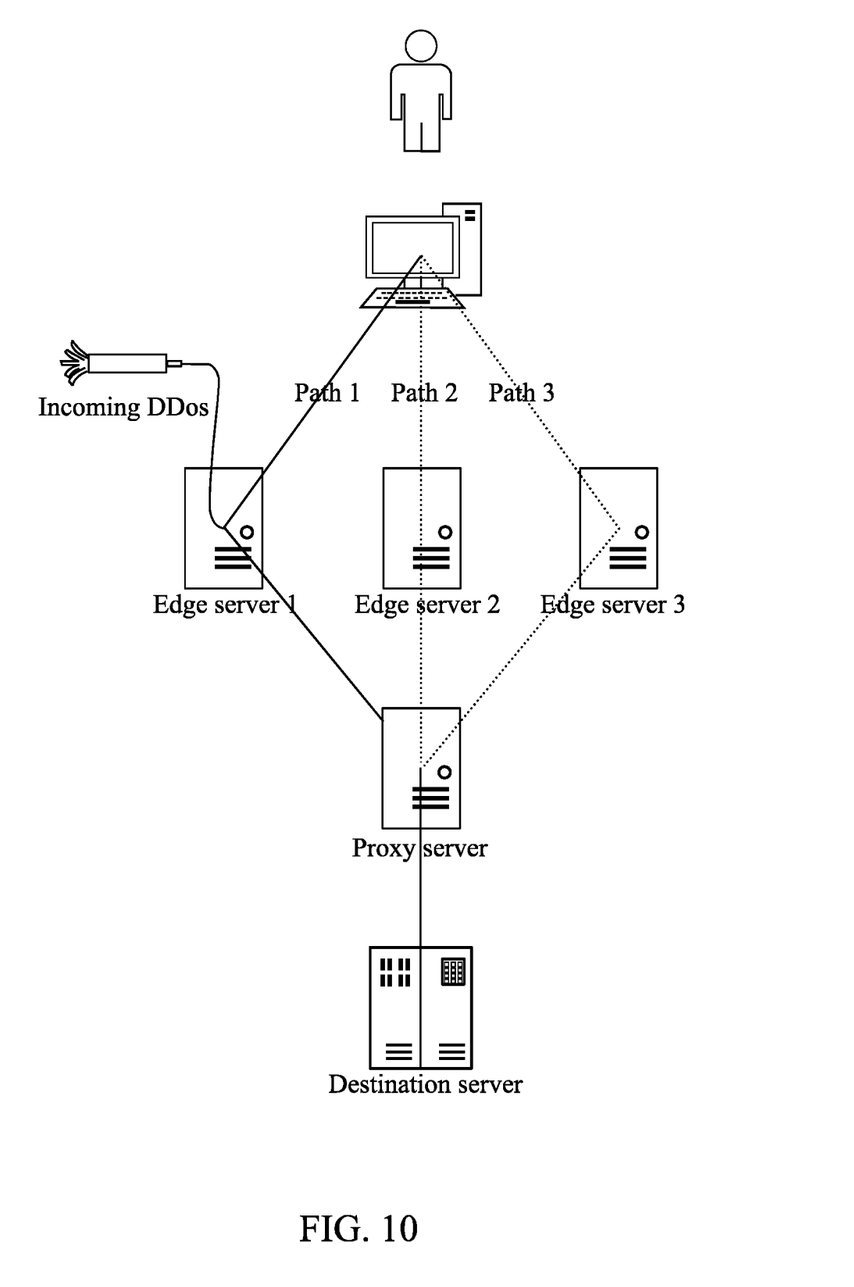
FIG. 10 is a diagram illustrating the manner in which redundant data streams and edge servers mitigate incoming malicious activity.

An additional measure of the present invention for redundancy is incorporating multiple data streams between the computing device and the destination server, as illustrated in FIG. 10. This is referred to as near real time (NRT) session failover. Multiple redundant data streams may be used to ensure redundancy and the integrity of NRT data. The problem of an edge server failing or being attacked is mitigated through this redundancy, so that if an edge server fails and thus impedes one data stream, at least one of the redundant data streams will achieve the goal of maintaining the session with as fast speeds as possible.

Figure 5:
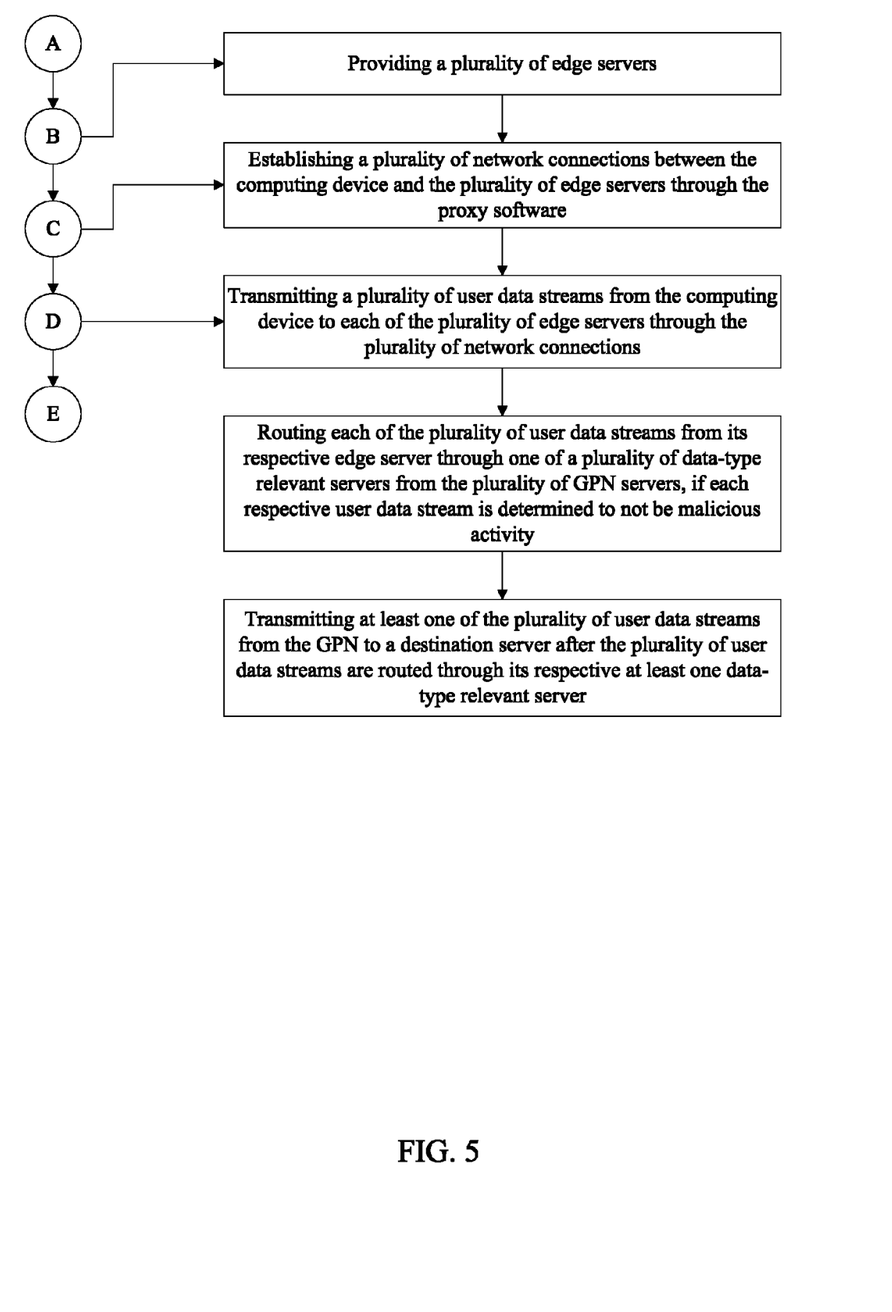
FIG. 5 is a stepwise flow diagram describing steps for utilizing redundant data streams.

More specifically, similarly to the general method disclosed previously and as shown in FIG. 5, in this embodiment a plurality of network connections are established between the computing device and the plurality of edge servers through the data routing software. A plurality of user data streams are transmitted from the computing device to each of the plurality of edge servers through the plurality of network connections. Each of the plurality of user data streams is identical, but transmitted to a different edge server through a different network connection. Each of the plurality of user data streams is routed from its respective edge server through one of a plurality of data-type relevant servers from the plurality of GPN servers if the respective user data streams are determined to not be malicious activity. At least one of the plurality of user data streams is transmitted from the GPN to a destination server after each of the plurality of user data streams is routed through its respective at least one data-type relevant server. Whichever user data stream arrives at the destination server first is utilized, and the rest of the user data streams are held in standby in case the first user data stream is disrupted.

The DDoS protection method of the present invention provides a number of advantages over traditional means of protection against malicious activity. Traditional means of protection are limited solely to Hypertext Transfer Protocol (HTTP) traffic including GET, POST, and HEAD requests, among others. In contrast, the protection method of the present invention is capable of protecting all online traffic and sources. As such, the present method is particularly useful for applications such as online gaming. Because the protected server is only accessible through the custom proxy client, all outside/other requests to access the server are dropped. The protection method of the present invention eliminates the need for scrubbing centers that are utilized in conventional means of protection against malicious activity. The effects of any DDoS attacks and other malicious activity are limited solely to the edge server that is closest to an attacker. Routing data through a scrubbing center typically causes data performance to suffer due to the increased latency. However, in contrast to conventional protection methods, the protection method of the present invention is capable of minimizing packet loss and improving data performance.

Figure 12:
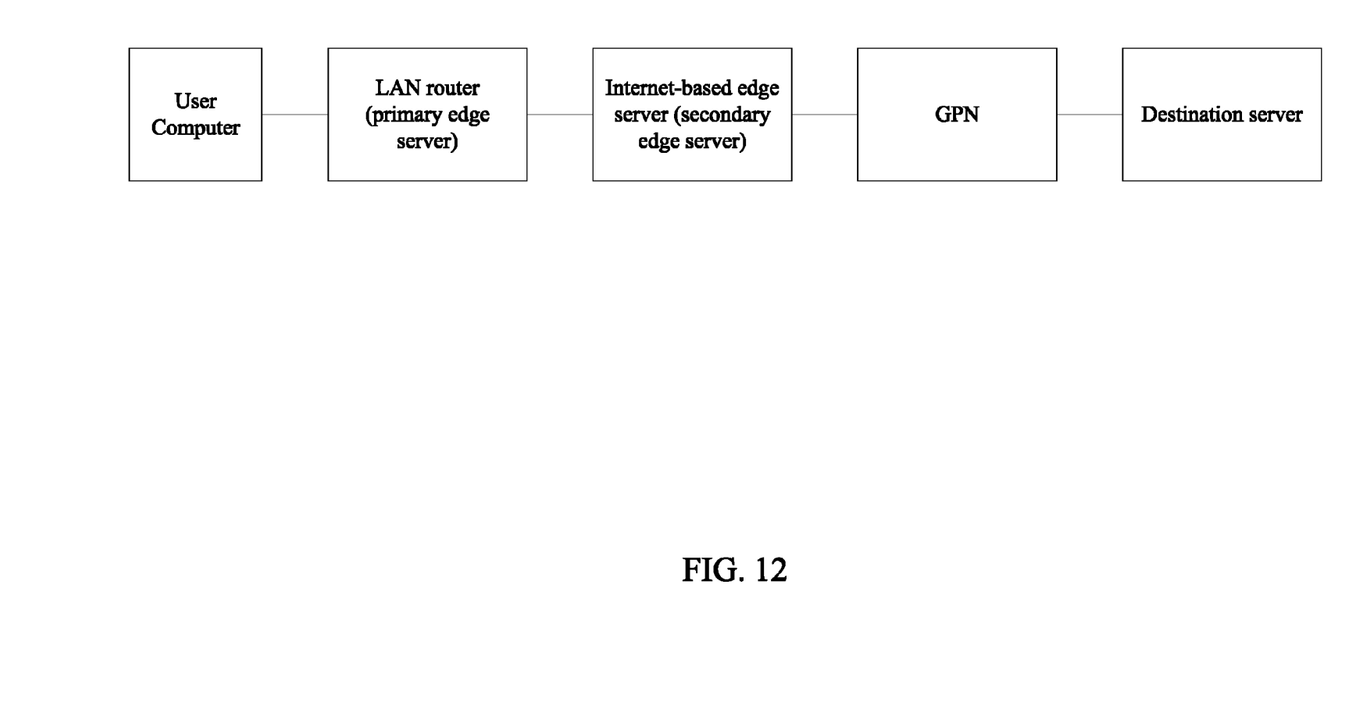
FIG. 12 is a diagrammatic overview of an alternative embodiment of the present invention.

In an alternative embodiment of the present invention shown in FIG. 12, the computing device is connected to a primary edge server as well as a secondary edge server. In this alternative embodiment of the present invention, the primary edge server comprises a LAN router which serves as an edge server for the GPN. The connecting user is able to view the internal IP address of the LAN router. After connecting to the LAN router/primary edge server, the user data stream is transferred to the secondary edge server. The secondary edge server comprises an Internet-based edge server that is located in close network proximity to the user's computer. The implementation of an initial edge server provides a level of protection for the Internet-based GPN edge servers from malicious activity as the Internet-based GPN servers are hidden from users as well.

Although the invention has been explained in relation to its preferred embodiment, it is to be understood that many other possible modifications and variations can be made without departing from the spirit and scope of the invention as hereinafter claimed.

What is claimed is:

1. A method of Distributed Denial of Service (DDoS) and hacking protection for internet-based servers by executing computer-executable instructions stored on a non-transitory computer-readable medium, the method comprising:
   providing data routing software on a computing device;
   establishing a first network connection between the computing device and a first edge server through the data routing software,
   establishing a second network connection between the computing device and a second edge server;
   transmitting a first user data stream from the computing device to the first edge server through the first network connection;
   transmitting a second user data stream from the computing device to the second edge server through the second network connection, wherein the second user data stream is redundant to the first user data stream;
   transmitting the first and second user data streams from the first and second edge servers, respectively, to a global private network having a plurality of global private network servers and, subsequently, transmitting the first and second user data streams from the global private network toward a destination server;
   determining the first user data stream to arrive at the destination server before the second user data stream;
   utilizing the first user data stream based on the determination that the first user data stream arrived at the destination server before the second user data stream;
   analyzing incoming traffic to the first and second edge servers to determine whether the incoming traffic constitutes malicious activity;
   determining incoming traffic to the first edge server constitutes malicious activity;
   after determining incoming traffic to the first edge server constitutes malicious activity, blocking the incoming traffic at the first edge server in response to determining incoming traffic to the first edge server constitutes malicious activity; and
   after blocking the incoming traffic at the first edge server, utilizing the second user data stream at the destination server.

2. The method of claim 1, wherein the destination server is obfuscated from the computing device by the global private network.

3. The method of claim 1,
   wherein the determining incoming traffic to the first edge server constitutes malicious activity comprises determining the incoming traffic as malicious activity when the incoming traffic comprises anomalous traffic, wherein anomalous traffic is traffic that is unexpected by the global private network.

4. The method of claim 1, wherein the plurality of global private network servers are proxy servers.

5. The method of claim 1, wherein the data routing software is a proxy software.

6. The method of claim 1, further comprising, after determining the first user data stream to arrive at the destination server before the second user data stream, placing the second user data stream in standby.

7. The method of claim 6, wherein the utilizing the second user data stream at the destination server comprises: removing the second user data stream from standby and utilizing the second user data stream at the destination server.

8. A non-transitory computer-readable medium storing a plurality of instructions which, when executed by a processor, cause the processor to perform operations for providing Distributed Denial of Service (DDoS) and hacking protection, the operations comprising:
   providing data routing software on a computing device;
   establishing a first network connection between the computing device and a first edge server through the data routing software,
   establishing a second network connection between the computing device and a second edge server;
   transmitting a first user data stream from the computing device to the first edge server through the first network connection;
   transmitting a second user data stream from the computing device to the second edge server through the second network connection, wherein the second user data stream is redundant to the first user data stream;
   transmitting the first and second user data streams from the first and second edge servers, respectively, to a global private network having a plurality of global private network servers and, subsequently, transmitting the first and second user data streams from the global private network towards a destination server;
   determining the first user data stream to arrive at the destination server before the second user data stream;
   utilizing the first user data stream based on the determination that the first user data stream arrived at the destination server before the second user data stream;
   analyzing incoming traffic to the first and second edge servers to determine whether the incoming traffic constitutes malicious activity;
   determining incoming traffic to the first edge server constitutes malicious activity;
   after determining incoming traffic to the first edge server constitutes malicious activity, blocking the incoming traffic at the first edge server in response to determining incoming traffic to the first edge server constitutes malicious activity; and
   after blocking the incoming traffic at the first edge server, utilizing the second user data stream at the destination server.

9. The non-transitory computer-readable medium of claim 8, further comprising, after determining the first user data stream to arrive at the destination server before the second user data stream, placing the second user data stream in standby.

10. The non-transitory computer-readable medium of claim 9, wherein the utilizing the second user data stream at the destination server comprises: removing the second user data stream from standby and utilizing the second user data stream at the destination server.

* * * * *